United States Patent
Hodge et al.

(10) Patent No.: US 10,582,163 B2
(45) Date of Patent: Mar. 3, 2020

(54) MONITORING AN AREA USING MULTIPLE NETWORKED VIDEO CAMERAS

(71) Applicant: 725-1 CORPORATION, Palo Alto, CA (US)

(72) Inventors: Andrew Hodge, Palo Alto, CA (US); Nathan Ackerman, Palo Alto, CA (US); Jean-Paul Labrosse, Altadena, CA (US)

(73) Assignee: OWL CAMERAS, INC., Palo Alto, CA (US)

( * ) Notice: Subject to any disclaimer, the term of this patent is extended or adjusted under 35 U.S.C. 154(b) by 0 days.

(21) Appl. No.: 15/864,342

(22) Filed: Jan. 8, 2018

(65) Prior Publication Data
US 2018/0218582 A1     Aug. 2, 2018

Related U.S. Application Data

(63) Continuation-in-part of application No. PCT/US2017/050991, filed on Sep. 11, 2017.
(Continued)

(51) Int. Cl.
*G08B 13/196* (2006.01)
*H04N 7/18* (2006.01)
(Continued)

(52) U.S. Cl.
CPC .......... *H04N 7/181* (2013.01); *G06F 16/787* (2019.01); *G06F 16/7837* (2019.01);
(Continued)

(58) Field of Classification Search
CPC ............ G08B 13/9613; G08B 13/9684; G08B 13/19658; G08B 13/19647; H04N 7/181; G06K 19/06009; G06K 9/00771
See application file for complete search history.

(56) References Cited

U.S. PATENT DOCUMENTS

| 2013/0040600 A1* | 2/2013 | Reitnour ................. H04W 4/90 455/404.2 |
| 2014/0254934 A1 | 9/2014 | Laxminarayana Bhat et al. |

(Continued)

OTHER PUBLICATIONS

Safety Track, UCIT Live HD Dash Cam, Vehicle Video Recorder Live View Player User Guide, Sep. 2016.
(Continued)

*Primary Examiner* — Shawn S An
(74) *Attorney, Agent, or Firm* — Marton Ribera Schumann & Chang LLP; Chien-Ju Alice Chuang; Hector J. Ribera

(57) ABSTRACT

A system and method to connect several cameras located in a given location, such as a parking garage, or area, such as in a neighborhood, is provided. The system allows each camera to function independently from each other with the purpose of recording video within the field of view of the particular camera. Image recognition processes the video to identify objects of interest and generate classification data. A search request can be generated, for example, by touching on a specific object shown on a display of the video, and networked cameras are searched for classification data that matches the search request, e.g., the selected object. Networked cameras can determine the relative spatial views of other cameras. Within a prescribed location or area, a camera or other user can access other networked cameras to extend the range of the search for the requested classification data in a "peer-to-peer" manner. Artificial intelligence software and logic is used to determine which of the surrounding networked cameras is likely to provide requested classification data.

20 Claims, 6 Drawing Sheets

Related U.S. Application Data

(60) Provisional application No. 62/412,764, filed on Oct. 25, 2016.

(51) Int. Cl.

| | |
|---|---|
| G06K 19/06 | (2006.01) |
| G06K 9/00 | (2006.01) |
| G06Q 40/08 | (2012.01) |
| G06Q 50/18 | (2012.01) |
| G11B 20/00 | (2006.01) |
| H04N 21/2347 | (2011.01) |
| H04N 21/433 | (2011.01) |
| H04N 21/44 | (2011.01) |
| H04N 21/472 | (2011.01) |
| H04N 21/482 | (2011.01) |
| H04N 21/61 | (2011.01) |
| G06F 16/783 | (2019.01) |
| G06F 16/787 | (2019.01) |
| H04N 5/232 | (2006.01) |

(52) U.S. Cl.
CPC ... *G06K 9/00771* (2013.01); *G06K 19/06009* (2013.01); *G06Q 40/08* (2013.01); *G06Q 50/18* (2013.01); *G08B 13/19613* (2013.01); *G08B 13/19647* (2013.01); *G08B 13/19658* (2013.01); *G08B 13/19684* (2013.01); *G11B 20/0021* (2013.01); *H04N 5/23245* (2013.01); *H04N 21/2347* (2013.01); *H04N 21/4334* (2013.01); *H04N 21/44004* (2013.01); *H04N 21/472* (2013.01); *H04N 21/4825* (2013.01); *H04N 21/6125* (2013.01)

(56) References Cited

U.S. PATENT DOCUMENTS

| | | |
|---|---|---|
| 2015/0085159 A1 | 3/2015 | Sinha et al. |
| 2016/0224837 A1 | 8/2016 | Lipert et al. |
| 2019/0149772 A1* | 5/2019 | Fernandes ........... G06F 3/04847 348/159 |

OTHER PUBLICATIONS

Safety Track, UCIT Basic-Live 2 Camera, Vehicle Video Recorder Installation Manual, Jun. 2015.

* cited by examiner

MONITORING AN AREA USING MULTIPLE NETWORKED VIDEO CAMERAS

CROSS-REFERENCE TO RELATED APPLICATIONS

This application is a continuation-in-part of and claims priority to PCT Patent Application No. PCT/US17/50991, entitled "Video-Based Data Collection, Image Capture and Analysis Configuration," filed Sep. 11, 2017, which claims the benefit of U.S. Provisional Application No. 62/412,764, filed Oct. 25, 2016, the contents of which are hereby incorporated by reference in their entirety.

BACKGROUND OF THE INVENTION

The present invention relates generally to a system for managing the recording, collection and selective presentation of video data, and more particularly, to a video management system to manage a collection of cooperating video cameras for monitoring and recording an event or area of interest.

Good surveillance systems are helpful to provide security and protection of people and property. For example, businesses and homeowners regularly install security cameras around their businesses, homes, and other property to provide video surveillance so that in the event of a burglary, theft, invasion, damage to property, or other criminal activity the captured video data can be used to identify the perpetrators and help piece together what happened. Sometimes the captured video data is useful and may help the police successfully identify and eventually apprehend those involved in the criminal activity.

With the availability of low-cost digital video cameras, residential security camera systems have become popular, typically with local or cloud-based video recording and storage services. However, to-date, typical home security camera systems record at relatively low resolution, making it difficult to discern relevant details of any event that may have been captured. Also, although many current home security cameras provide a source of illumination for nighttime use, such illumination, which is usually in the form of infrared LEDs, is rarely effective beyond 20 feet. In addition, most criminal events take place at night, and more importantly, most criminals are either aware of the field of view of security cameras that may be prominently located around the home and criminals make efforts to avoid being recorded by them and also often wear clothing that obscures facial features and other identifying details so that even if a security camera did happen to record a criminal in action, the recorded footage would not reveal useful information, other than perhaps a general description of the criminal miscreant (e.g., height, build, etc.).

Another environment where security cameras are often employed is parking lots and garages. For example, in commercial parking garages, where drivers pay to park their cars for a period of time, security cameras are usually employed to provide surveillance. However, typically the cameras only cover the main entrances and exits of the building and possibly some general views of each floor. A criminal may easily bypass the field of view of the minimal camera coverage and break into cars that are not being surveilled or are outside or far in the field of view of the cameras. For example, when the owner of a vehicle arrives at a restaurant that provides valet parking services, he or she relinquishes his or her vehicle to the valet attendant, essentially a stranger, and receives a small paper receipt in return. The attendant drives off to park the vehicle at some unknown location, typically a garage, while the owner tries to stay focused on the upcoming fine food experience. Needless to say, all vehicle owners experience a level of stress and concern regarding any valet service because of the unknown. If they receive their vehicle damaged or with items missing from within, or even with evidence that their car was driven outside the garage, it's a hassle to file a claim and difficult to prove fault.

Similarly, when people park in open free parking lots of the type typically provided adjacent shopping centers or businesses, even though there are usually security cameras positioned throughout the area, the footage of these cameras are not available to the owners of the cars parked in the lot.

One potential solution to these parking-related issues is the use of video cameras in vehicles. So-called "dash-cams" or "car-cams" are typically mounted to the windshield or dashboard of a vehicle and are used to record forward-facing video of the path of travel as the vehicle moves. Various features are becoming more popular in current dash-cam models, such as including a cabin-view camera, and motion activation, which could be used to capture video of break-in or theft events inside the vehicle. For example, when a driver of a dash-cam enabled vehicle enters a parking lot, the dash-cam (if continually powered) may continue to record its field of view, even when the car is parked. This recorded viewing angle may prove useful if an event were to happen to the owner's vehicle inside the camera's field of view. Unfortunately, the vehicle owner would have no recorded information regarding an event occurring outside the camera's field of view because the event would have occurred in the blind-spot of the camera. To help provide a greater field of view, some dash-cam designs employ a 360 degree lens. Although this type of lens does increase the field of view, the view is inherently filled with obstructions, such as most of the vehicle, often include optical artifacts, and may require software to resolve. Similarly, if an automobile is subject to a forced entry incident (a break in), a car-camera in that car may quickly be stolen, knocked down, or otherwise made inoperative. Also, in the case of an automobile accident, the car-camera itself may become severely damaged or knocked off its mount and be unable to record or "see" the events which take place during and after the impact. This is unfortunate since important visual evidence occurring after the accident may be lost.

In-vehicle camera systems also provide additional features. For example, when travelling on a road, drivers always benefit by knowing what lies ahead of them. Some vehicle systems provide cameras and other sensors to scan the area immediately in front of the vehicle to provide information to the driver and, sometimes, to assist with safety controls, such as to avoid a collision, to stay within the road, or more recently, to provider auto-pilot and self-driving features. However, these systems are limited to the field of view or sense immediately in front of the vehicle. Drivers may resort to other connected systems, such as on-board guidance systems or smartphone applications, to receive additional information about what lies ahead, such as traffic congestion or accidents, road obstructions, or the like, but these apps typically rely on other drivers to actively participate, as they drive to provide the information to be distributed to others using the application. The information often requires the participant to manually input data or manipulate their smartphone. Of course, manually inputting such information is distracting and dangerous to both the driver of one car and the neighboring vehicles and pedestrians. There are no known applications or devices that provide user-selectable real-time visual information of what lies ahead, beyond the line of sight of the driver.

Accordingly, there is a need for a system to expand the coverage of an event or area from monitoring video cameras in the area and increase the likelihood that useful video evidence, e.g. of a fleeing suspect, will be obtained and overcome the shortcomings of the prior art.

BRIEF SUMMARY

According to various embodiments of the present invention, a method of sharing video data between a plurality of remote cameras and a local camera in wireless-communication with each other is provided. According to this embodiment, a preliminary search is initiated at the local camera to search the plurality of remote cameras by automatically searching the memory in each of the remote cameras for data that matches a search criteria. In response to the preliminary search, an indication that the data in the memory of at least one of the remote cameras matches the search criteria is received, which in some embodiments may include identification information of the remote cameras matching the preliminary search. Permission to perform a secondary, more detailed and comprehensive, search of the remote cameras is requested at the local camera. The secondary search is requested to identify video data matching a video search query. Video data matching the video search query is received.

In one embodiment, the permission requesting step is performed in response to receiving the indication that data in the memory of one or more of the remote cameras matches the search criteria, which optionally may include metadata and location information of the local camera, and in some embodiments, may also include classifier data.

According to another embodiment, a method of improving the accuracy of matching video stored in a remote video camera with a search criteria from a local camera is provided. A search, based on a search algorithm, of the memory of the remote camera for data that matches the search criteria is requested. The search results from the requested search based on the search algorithm, including video data with portions matching the search criteria, are received and the video portions are displayed on a display associated with the local camera. A user confirms which of the video data portions actually match the search criteria, for example, by touching a touch-screen display to select the matching portions. The search algorithm is adjusted based on the user confirmation to improve the accuracy of subsequent searches. According to one embodiment, the adjusted search algorithm is then used to perform a subsequent search of the remote device.

According to another embodiment, a method of sharing video data related to an event between a remote camera device and a local camera device is provided. The camera devices are in wireless-communication with each other. At the local camera device, a search request is created defining search criteria that includes metadata and a video clip corresponding to the event. The search request is transmitted to the remote device and a user of the remote device who can authorize the requested search is notified to seek permission for the search. The video clip is played for the authorizing user, which may take place automatically. In response to granting permission, video data meeting the search criteria is received at the local camera device.

According to one embodiment, the search request includes a text message from a user of the local camera device to the authorizing user of the remote camera device.

The features of described in this disclosure, and the manner of attaining them, will become more apparent and the invention itself will be better understood by reference to the following description of the disclosed embodiments taken in conjunction with the accompanying drawings.

The figures depict various example embodiments of the present disclosure for purposes of illustration only. One of ordinary skill in the art will readily recognize form the following discussion that other example embodiments based on alternative structures and methods may be implemented without departing from the principles of this disclosure and which are encompassed within the scope of this disclosure.

DETAILED DESCRIPTION OF THE INVENTION

The Figures and the following description describe certain embodiments by way of illustration only. One skilled in the art will readily recognize from the following description that other embodiments having varying or alternative structures may be implemented without departing from the principles of the disclosure. Reference will now be made in detail to several embodiments, examples of which are illustrated in the accompanying figures. It is noted that wherever practicable similar or like reference numbers may be used in the figures and may indicate similar or like functionality.

By way of introduction, the present invention relates to a video management system for capturing, storing, authenticating, analyzing, accessing and presenting video files when needed. As described in Applicants' PCT Patent Application, entitled, "Video-Based Data Collection, Image Capture and Analysis Configuration", filed Sep. 11, 2017, having serial number, PCT/US17/50991, the system according to the disclosure, manages video data from one or more of a plurality of client devices, each of which has at least one video camera, a processor, memory, several sensors a cellular communication module and a Bluetooth communication module. Each client device is either mobile—mounted to a vehicle, or mounted to a fixed object so that at least one video camera records video data (with a field of view generally covering the forward view of the vehicle in the case of a vehicle mounted client device). The sensors of each client device are configured to generate metadata. The processor associates the metadata with recorded video data and encrypts the data stream. The processor, at prescribed times, transmits the encrypted video and metadata to a cloud-based server using the cellular communication module. The encrypted video files are stored in a cloud-based server for secured access.

Figure 1:
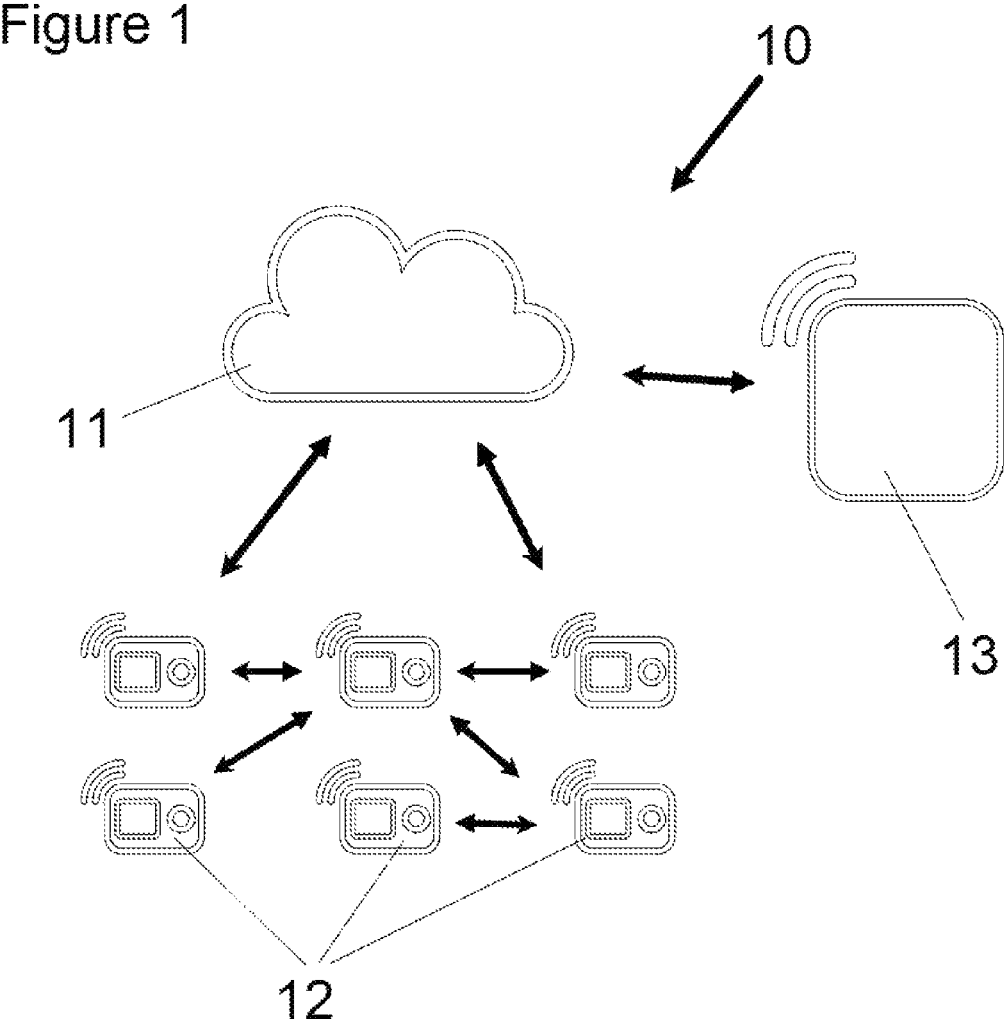
FIG. 1 is a schematic showing a plurality of networked client devices and a cloud-based server according to one embodiment.
Figure 2:
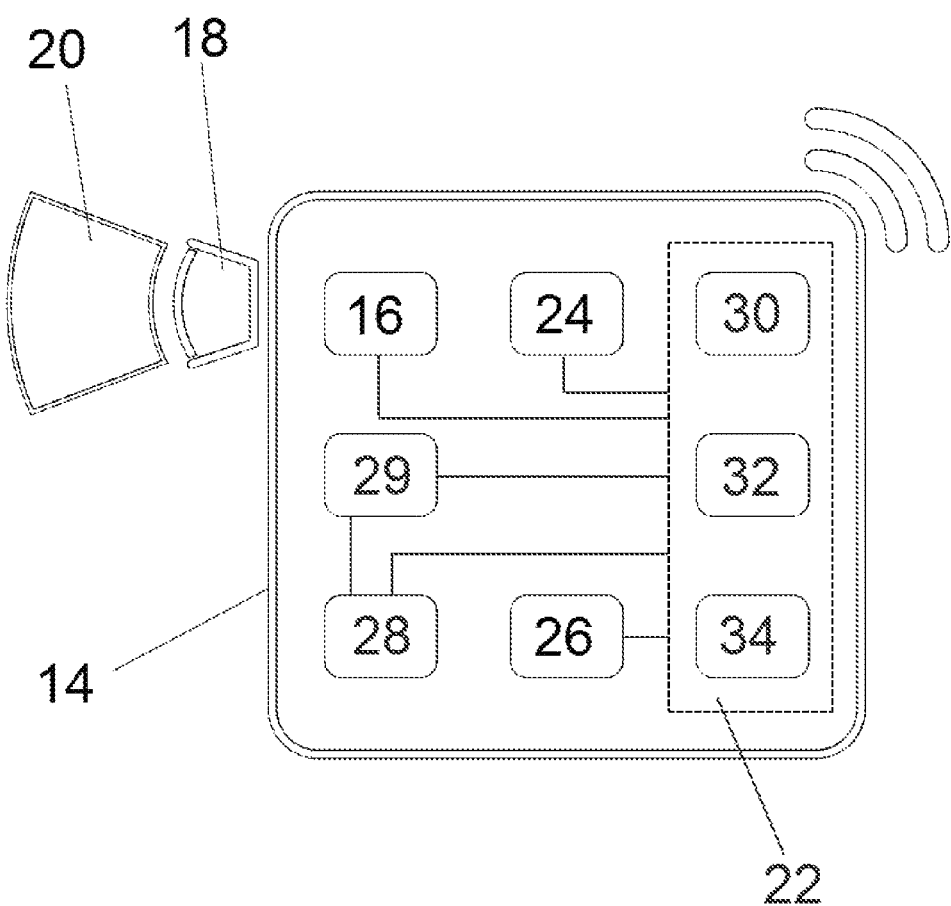
FIG. 2 is a plan view of a client device according to one embodiment.

Referring to FIGS. 1 and 2, and according to a first embodiment of this disclosure, a management system 10 includes an Internet connection (cloud) 11, a network of client devices 12, and a remote server 13. Each client device includes a body 14, a video camera 16, a lens 18 (defining a field of view 20), controlling circuitry 22, video memory 24, RF communication circuitry 26, a source of power 28, and a touchscreen display 29. Controlling circuitry 22 includes a microprocessor 30, processor memory 32, and all other required supporting circuitry and electronic components 34. Parent application, PCT Patent Application No. PCT/US17/50991 (incorporated by reference), describes in more detail a suitable video management system for carrying out the functions described herein. All the internal electronic components of client device 12 are electrically connected to each other in such a way as to allow for their independent and supportive operation as described in the parent application.

According one embodiment of this disclosure, each client device 12 is able to communicate with server 14 and with any other client device 12 within the network. This communication may include transmitting and receiving data and instructions, depending on the particular operation being performed.

Figure 3:
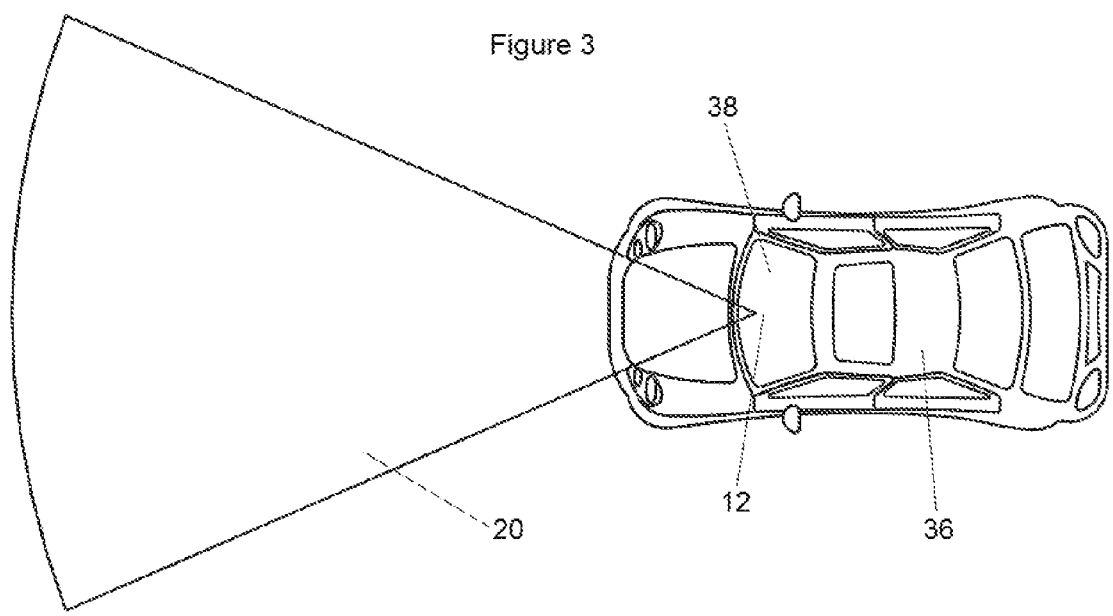
FIG. 3 is a plan view of an exemplary vehicle using a client device, mounted to the windshield, according to one embodiment.

As shown in FIG. 3 and according to one embodiment, at least one, but preferably most of client devices 12 are of the type that can be mounted to the dashboard or windshield 35 of a vehicle 36, taking the form of what is commonly referred to as a "car-cam" or a "dash-cam."

Figure 4:
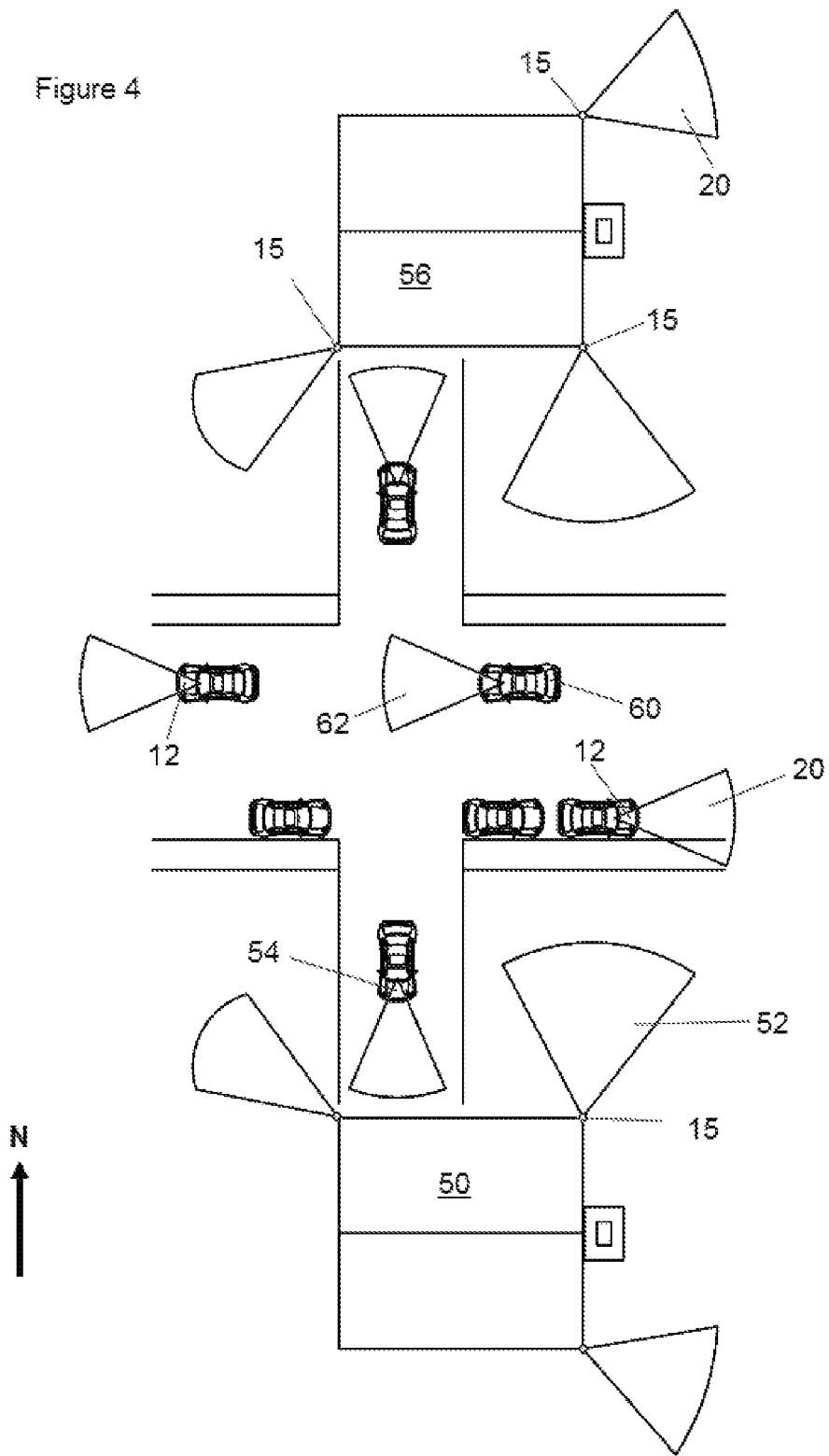
FIG. 4 is a plan view of an exemplary neighborhood, including various vehicles and homes, according to one embodiment.

Referring to FIGS. 3 and 4 and according to one embodiment of the disclosure, client devices 12 work together to form a network of video recording devices to continuously record and store video data. According to this embodiment, a fixed client device 15 may be securely mounted to a house or building structure 40, as shown in FIG. 4. In such instance, fixed client device 15 is likely not easily accessible and does not include touch-screen display 29. Such fixed client devices 15 will likely be mounted high along an outside wall of the house or building structure 40 and therefore not directly interactive with a user. Fixed client devices 15 are essentially video-footage suppliers to other client devices 12 in the network.

According to one embodiment, if both mobile client devices 12 and fixed client devices 15 are used in a particular network, mobile (or otherwise accessible) client devices 12, which do include touch-screen display 29, will provide a user interface to allow the user to set-up and later operate any fixed client devices 15. In one embodiment, each fixed client device 15 could be owned by a user of a mobile client device 12, such as the owner of a home may have a security surveillance system including several fixed client devices 15 mounted to various parts of his or her house 40 and a mobile client device 12 which is mounted to the windshield 38 of his or her vehicle 40. Together, the fixed and mobile client devices are all part of a subgroup of the larger client network. For example, in one embodiment, all the fixed and mobile client devices owned by a common owner can follow the instructions of the mobile client device 12 of that subgroup. This means that any search requests, as described below, from client devices 12 located outside the subgroup network will be unable to directly reach any of the fixed client devices 15—only the mobile client device 12.

Regardless, during normal operation, each client device 12 operates independently from the other client devices in the network and continuously records video data from within field of view 20 of lens 18 (and also records audio data and optionally metadata, such as time and date stamp and compass orientation, from the general area using appropriate microphones and sensors, not shown). According to the invention, microprocessor 30 located within each client device runs a suitable object-recognition software program, such as "TensorFlow," or "Caffe," to analyze each frame of recorded video, preferably concurrent to it being recorded, extract and then store all known and unknown image classifiers for each frame captured during recording. For example, if, during daytime, a boy runs after a yellow ball in the yard of house 40, a fixed client device 15 will record the event. Microprocessor 30 located within client device 15 will apply object-recognition software to the images as they are being recorded and will recognize the boy as being a boy, the action of running, and a yellow-colored object that is shaped circular, like a ball. This information will be stored in video memory 24, as object classifier data. If stored video data is transmitted (or otherwise transferred to another location), it may include metadata and any classifier data for each frame (or predetermined length) of video. As described below, if any stored video data requires a computer-controlled object-based search, the computer may search the classifier data and the metadata only, since the video has already been analyzed.

According to one embodiment, any search request from any client device 12 in the network can be performed by microprocessor 30 of each client device 12, whereby each client device may search the classifier data and the metadata of the video stored in video memory 24, and also all newly analyzed video (in real-time). Once complete, the search results will be transmitted using RF transmitter circuit 26 to the client device of the requesting party. The transmission for any data, according to this embodiment, may be sent directly to another client device 12, in a peer-to-peer manner, or it may be transmitted first to a cloud-based server 13 over a suitable wireless network service, such as LAN or 4G, either continuously, in response to a request, or at prescribed times. Server 13 may analyze and store any received data and later transmit selective stored data, including stored video data, metadata, classifier data, or search results, to any particular client device 12, portable electronic device, or authorized computer, after verifying permission.

As mentioned above, according to one aspect of the present disclosure, initial object-recognition and object classification work may be preferably performed locally by each independent client device 12 during initial video recording (or shortly thereafter). In this regard, many operations, such as object searching, may be performed efficiently and effectively using only a single client device, or select client devices based on factors related to the object being searched, or all of the networked client devices, simultaneously. By controlling which client devices are enlisted to assist in a search request, the searching becomes quicker, more accurate and more efficient than searches performed using conventional security systems, as described below.

According to one embodiment, cloud-based server 13 is not required to perform many of the operations and functions of the present invention, since client devices 12 are networked and may effectively communicate with each other, in a peer-to-peer manner and perform many functions independently. However, in some cases, being able to have client devices 12 communicate with cloud-based server 13 is beneficial and preferred. Depending on conditions, raw video data may be sent to server 13 without first performing object recognition and without providing any classifier data.

In such instance, processors (not shown) at server 13 may use object recognition software to analyze the received raw video data and generate classifier data. By doing this, memory and processor time within each client device 12 may be freed up. As mentioned above, this classifier data may be used to assist in a search request at a later time, as described in greater detail below.

According to one embodiment, by way of example, during an event located within field of view 20 of at least one networked client device 12, some information will be recorded by video camera 16 of at least one client device 12. A user of that particular client device 12 may review recorded footage of the event on touch-screen display 29 and see a section of video that appears to show "objects of interest." This could be an image of a face of a suspect involved in the event or perhaps a red baseball cap the suspect appeared to be wearing in the captured video. The user decides he needs more footage from other networked devices to help locate him in the neighborhood and warn others of his whereabouts. The user sends out a search request. According to one embodiment of the invention, the user may instruct the local client device 12 to send out an automatic search request based on the section of video footage that shows the "objects of interest."

According to one embodiment, microprocessor 30 of local client device 12 transmits the object classifier data of that section of video and other necessary data (such as metadata) to nearby (or all, or select) client devices 12 of the network and instructs those devices to search their respective video memory 24 for any images (or video clips) whose object classifiers match, within a predetermined acceptable level of accuracy, the object classifiers of the search request. Nearby client devices 12 are then instructed to transmit any "hits" from the search back to the local client device 12 for quick review. A hit may include a still image, or a video clip showing a predetermined amount of time before and after the matching object classifier, such as 30 seconds before and after.

The user may then quickly review the received hits and select any that appear to be particularly relevant and use this information to refine the search. The user at this time may further elect additional "objects of interest" from any of the images or video clips of the received hits to help narrow down a secondary revised search. Microprocessors 30 would use the specific object selections made by the user to "fine tune" the secondary searching efforts, likely yielding more accurate results, the second time around. By providing the human user a chance to review video clips from a search and further classify initial search hits by levels of importance allows the computer to fine-tune searching criteria, which will likely improve the accuracy of future searching.

An "event" may be, for example, a crime in progress, an accident, a party or a social gathering, or may just be a point of interest, such as the Golden Gate Bridge.

Alternatively, in one embodiment, the user may initiate a manual search to other client devices 12 on the network for an object of interest that the user captured on his client device 12. The user, as before, simply touches on display 29 of his client device, the object or objects that he wishes to search. For example, the user wishes to find more footage (and the location of that footage) that includes any red baseball caps so he initiates a search by selecting the baseball cap on display 29 of his client device 12 (by touching the baseball cap on the image on the display 29) when it appears during the playback of a recorded video clip. Microprocessor 30 of his local client device 12 is then able to identify the selected object using object recognition software. His client device 12 then uses RF communication circuitry 26 to send out a search request to select client devices 12 nearby. Microprocessor 30 knows the location and identification of all client devices in the area (either by communicating with server 13, or using RF ranging techniques, such as BLE beacons, or WiFi beacons) and can use this information to select any of them to search their video memory for any footage including a red baseball cap.

According to another embodiment, microprocessor 30 analyzes the object classifier data of the video clip showing the selected object (in the above example, the red baseball cap) to determine its speed and direction of movement (assuming the selected object has moved from the field of view). Once this is determined, microprocessor 30 compares the direction of movement with the locations of networked client devices and their respective fields of view 20 to calculate which client devices are most likely to show the selected object in their stored video footage, based on the movement of the selected object. Since the direction and speed of the object of interest is calculated, and the relative locations of each surrounding client device 12 is known, then an estimated time of arrival (ETA) when the object of interest will enter the field of view 20 of the different surrounding clients devices can also be calculated. The calculated ETA can be used during the search to narrow the data to be searched. Now selected surrounding client devices 12 (or cameras) need only search their respective memories for the object of interest (as defined by classifier data) around the calculated ETA for each particular client device 12.

For example, referring to FIG. 4, if the suspect with the red baseball cap is shown in the video clip running North from house 50 just as the suspect leaves the field of view of local client device 54, microprocessor 30 of the local client device 54 will transmit a search request initially only to networked client devices located North of the local client device 54, around house 56 (to search their respective memories just before and after the calculated ETA for the various known client devices located to the North), in the example shown in FIG. 4. This will speed up the searching process. If no results are found, then the search request will expand to additional client devices in the area. If a rate of speed is known of the object of interest, such as a person or a vehicle, but its direction is either not known, or is expected to change, then the search request can simply be applied to all client devices that encircle the location of the requesting client device 12, again searching their respective memories only a prescribed time before and after the calculated ETA for the first perimeter of client devices 12. If nothing is found, the perimeter can be extended outward. If a client device provides a confirmed "hit", then the searching algorithm can use the information to update the search request, perhaps to different client devices, depending on any new information, such as a new speed, a new direction of travel, etc.

According to another aspect of one embodiment, any networked client device 12 may send a search request to any other client device 12 in the network, following the instructions of a searching algorithm used by all networked client devices 12. For example, a first client device 12*a* may initiate a search by instructing a second client device 12*b* to search for a particular object of interest. If that second client device 12*b* fails to locate the selected object in its video memory during a similar time period as the original event (as determined by metadata), then the second client device 12*b* will automatically extend the area of searching by sending out its own search request to additional nearby client devices 12*c*-12*n*.

Regardless of the type of search being requested, the user may include additional classifiers which may be included as data on any memory chip. For example, the user may type directly into his or her local client device (or use voice or other form of input) to state that the object of interest is a small dog running East. Microprocessor 30 will be able to convert the inputted description (e.g., text or voice) into computer-understood classifier data and carry out the search request to nearby client devices, in this case, located to the East.

While client devices record video, according to one embodiment, various tags may be applied, either by the driver, through voice, text, or a touch-screen action, or automatically, by continuously using object recognition software on all objects appearing in field of view 20 of camera 16. The user may simply speak, as he or she is driving, an object that he or she sees (and is therefore also recorded by client device 12, such as "sunset," "Tesla," "Uncle Bob," etc.). These tags will cause microprocessor 30 to associate the tag description (i.e., a classifier), with the object that appears on the recorded video tape at that moment by creating a metadata record. Manual and automatically attached tags (subject matter labels) in video metadata allow the system to more efficiently search as it narrows down candidates for joining and sharing device views and captured footage. Automatic tagging allows the object recognition software to identify objects automatically. The user is asked on occasion to confirm that the computer is correct for certain recognitions, such as confirming that the computer correctly recognized Uncle Bob, or the Grand Canyon, etc. The confirmation by a human allows the system using artificial intelligence (AI) algorithms to learn and to increase prediction accuracy over time during future searches and recognition and further decrease search time and processing power required for these systems and operations. Specific combinations of classifier data will be common triggers for automatically applied tags. For example, a detected cluster of orange pixels within a recorded scene may indicate many different objects, but if the orange cluster of pixels is bouncing up and down, this added information narrows the potential objects to a few, including the likely classification of a basketball being bounces on a court.

According to one embodiment, a neural net determines which client devices are most likely to return matches within the timeframe required to search based on several factors, including, for example, which client devices 12 have opted in and which have opted out, the GPS location of the client device at the time of the event, the amount of memory on the different client devices being queried (how much video has been stored in the device's video memory), the speed of travel of the client device at the time of the event, the direction of travel of the client device at the time of the event, and other suitable factors. Referring again to FIG. 4, if a vehicle 60 with a client device 62 drove past the event location (house 50), at the same time, but was travelling 65 MPH at night, its video footage will be less likely to be helpful.

Once surrounding client devices complete their respective searches of their stored video memory 24, they will each transmit search results back to the local client device which initiated the search request, which will in turn notify the user by using touch-screen display 29, or his or her portable electronic device.

As understood by those of ordinary skill in the art, all data that is transmitted between client devices 12, any portable personal electronic device, and server 13 may be encrypted using any suitable encryption method.

The above-described automatic and manual searching between different client devices 12 of the network may be managed peer-to-peer between any one or more of the microprocessors 30 of different client devices 12 of the network, or by cloud-based server 13. In such instance, and according to one embodiment, a cloud-based object recognition software and a suitable AI software gathers searching information and, as described above, will use the information to determine which client devices 12 of the networked devices would be most likely to have captured a selected object of interest, and will then select those client devices 12 to initiate their respective search.

In some circumstances, there may be advantages to using a cloud-based server 13 to manage the search requests, as well as applying object recognition software to captured video clips. For example, in one embodiment, server 13 may have faster and more powerful processors and greater memory and may also include a larger set of available classifiers, than those found on some client devices 12. This would allow server 13 to identify and search objects of interest more quickly, efficiently, and more accurately.

According to another embodiment, a search request, regardless of if it is requested automatically or manually by a user, may first notify the owner of the selected client device 12 to gain permission to access the memory of their client device. The owner being asked only has to select an option on his or her touch-screen display, or portable electronic device to respond. The owner of the selected client device may review the request more closely, including the video clip taken by the requestor's device (if there is one), and any comments provided by the requestor, such as "I'm looking for my dog and need your help—may I have access to your cameras for the last 20 minutes? If so, please click 'YES'."

According to one embodiment, since any potential evidence is time-sensitive, system 10 automatically perform a preliminary background search of video memory 24 of any selected client devices 12 before notifying the owners of those devices to get their permission. This quick preliminary search allows the system to perform a quick cursory review of the metadata and classifier data files for any match relating to the requested search data. If a match is found, or a suggestion that there could be a match is found, then the owner of that specific client device 12 would be notified and permission requested to collect and transmit the relevant data. As is further described in the parent application, in one embodiment, the preliminary search results, positive or negative, may be used by the software program of system 10 to reassess the search situation to determine which other client devices, if any, should be interrogated to yield more accurate results. It is preferred that no search results (or any data) from any client device 12 that was preliminarily searched (i.e., without first notifying the owner) is saved in any memory to respect the owner's privacy. In basic terms, this approach can be summarized as one computer will search another computer for data relevant to a search request. If relevant data is found, the searching computer will ask for permission to copy the relevant data. If there is no relevant data found, then no data will be copied or otherwise saved. In any case, no data will be reviewed by a human, unless permission is given. By performing a preliminary search, the owner of a client device only has to be notified for permission to share data if it is determined that there is a high likelihood that that person's device has captured footage relevant to a legitimate share request.

According to one embodiment, system 10 allows for all users of client devices (during their initial setup) to manage how future permission requests are handled in advance so that they do not have to be bothered. For example, each user may opt to always grant any received permission, or always deny any received permission, always allow or deny, depending on the neighbor who is asking, or other combinations of conditions. If denying, in one embodiment, the system may remind the user that they will only be asked for permission to share their video data if the system 10 has determined that their device contains content that is relevant to the search request. System 10 will also remind the user the importance of an open system among device owners and that an open system, where every member of the network shares footage when asked allows the overall surveillance system to work best for everyone.

If permission is granted in response to a search request, a more detailed and thorough search may be performed. First, client device 12 is instructed to transmit the relevant portions, as defined in the search request (such as requesting footage taken between 4:30 pm to 6:30 pm on Nov. 3, 2017) of the video memory 24 of client device 12 to server 13. Thereafter, server 13 would perform the more detailed review and search of the metadata and classifier data, based on the details provided by the initial search request, such as specific "objects of interest." If a match is found during the detailed search, server 13 would notify the search requester and transmit the relevant search results to his or her client device 12 or portable electronic device for their review.

According to one embodiment, cloud server 13 uses artificial intelligence (AI) to learn more about matches and to help improve the accuracy and efficiency of future searches. When a match is found on a shared video clip, system 10 may use AI to generate additional classifiers based on less obvious nearby objects to help provide more information for any additional searching. For example, if a suspect was captured in the video of one client device wearing a red baseball cap, and then it is revealed that footage from a shared device shows a man wearing a red baseball cap running North and also wearing a gold watch. System 10 would identify the gold watch as a supporting object classifier and would now search for a man heading North wearing a red baseball cap and/or a gold watch (just in case he removes his cap as he runs). Also, as mentioned above, if system 10 locates a match, but the match is within a range of uncertainty, such as for example 90% certain, system 10 may ask for human assistance to validate the proposed matches. System 10 uses information uncovered from shared video data and the location information of the shared client devices 12 to continue to identify additional batches of searchable client devices 12 based on which devices found matches (e.g., devices North of the target all returned matches, whereas devices located West, East, and South found none). Also, system 10 may use object recognition, tracking software, and AI algorithms to determine not only the classifier associated with the object of interest, but details of how that object of interest is moving across the field of view of the particular camera. System 10 will effectively predict the trajectory of the object of interest from the field of view of the initial client device to other areas in the neighborhood and based on this trajectory, system 10 (or the initial client device 12) will query nearby client devices that intersect with the calculated path or trajectory of the object of interest. For example, if a suspect is captured running North, across a field of view of a first client device 12, that client device and determine that there is a high chance that the suspect may appear in the respective field of views of client devices 12 (including fixed cameras 15) located to the North of the first client device. Therefore, client device would initially only query those client devices located to the North and would not bother the client devices located to the East, West, and South.

According to one embodiment, system 10 will eventually become sufficiently trained to identify which client devices of the network may have captured relevant footage by using an iterative process that involves having a human verify which of any matching video footage from various client devices actually match the requested search information. System 10 can then learn and fine-tune the search criteria based on the human only selecting those that are 100% matching, and also learn from the proposed matches that were not selected, essentially asking "Why were the false-matches considered a match?" System 10 can then use this information to improve the accuracy and efficiency of future searching. By having human input, the object-recognition and searching system can be improved over time. At the same time, the system is capable of learning to detect false positives provided by the algorithms and heuristics and may refine them to improve accuracy in future searches.

When a match is found during a search, system 10 extracts all relevant video clips surrounding the actual matching frames and may include still-frames of the matching content, and all associated metadata and classifier data. The information is then encrypted and transmitted to all parties involved, including the person who initially requested the search and the person who provided the shared content. All members of the network could also be notified that a successful share has occurred. In one embodiment, for example, a reward system may be provided to benefit networked users who share footage and those who actively request searches. Such a system would incentivize frequent sharing activity within the network which in turn, would increase the effectiveness and range of the surveillance capabilities of the system.

According to another aspect of one embodiment, the network of client devices 12 of system 10 can be positioned throughout a neighborhood, for example. Different sub-groups of client device owners may accept in advance to work together by effective joining the video output with each other so that access to each others' cameras is always available, following a pre-approved sharing agreement. For example, two neighbors can "connect" their client devices 12 with each other so that cameras 16 of one house can watch the other house, and vice versa. In the case that client devices 12 are mobile, such as car-cams, then each car-cam in the sub-group would be able to detect the proximity of other car-cams that are part of the same sub-group when they are nearby. This could be done using GPS, Bluetooth, or similar communication technology. If at least one client device 12 of a sub-group is mobile, then they can automatically connect and share video at any location, as long as at least two client devices are in proximity of each other (proximity may be, for example, located within 100 to 300 feet, but can be different distances depending for example on communication technology, density of housing, and the like).

In addition, in this embodiment, more than one client device 12 may be moving at the time. So, in one embodiment, if two client devices are driving near each other on a highway, then the driver of each vehicle can activate their client device to view the output of the other driver's client device 12. The two drivers can essentially video-chat with each other, in real time, and record the conversation. A method for linking nearby client devices 12 includes providing a first video camera (a first client device 12) in a first area for creating a first data. Then, providing a second video camera (a second client device 12) for creating a second data wherein at least the second video camera is mobile and is entering the general area near the first video camera. Then, either the first or the second camera (or server 13) detects if the two cameras are located in proximity to each other. If so, then data from at least one video camera is automatically transmitted to the other. Data is transmitted only if each owner approves of the transmission.

According to this embodiment, joining two or more client devices as a sub-group with pre-approved sharing privileges, allows each member of the sub-group to enjoy greater coverage of their surveillance system, since all members work together, "keeping an eye out" for each other.

According to one aspect of one embodiment, each client device 12 may know, or otherwise query, the location and the orientation of the field of view of every other client device located in the network, or sub-group. Since some or all client devices in a given network or sub-group may be mobile, there is an effort to always provide as much coverage within the neighborhood, or monitored area as possible, especially high-value regions within the area, such as the front doors of houses (about 80% home break-ins occur through the front door).

According to one embodiment, sub-groups of client device members may be provided with pre-approved sharing privileges so as to increase the visual surveillance coverage of a particular area, such as within a neighborhood around a person's home and vehicle, attempting to provide coverage as thorough as possible. According to this embodiment, system 10 determines the field of view 20 of each video camera 16 within a particular sub-group and then creates a virtual map of the area, showing which regions are covered by cameras and which are not. The system then uses this information to suggest parking locations to arriving members of the sub-group so that their field of view can be used to help "fill-in" any uncovered regions.

For example, according to this embodiment, if a neighbor's house is still not being "watched" by any camera or client device by 8 PM and a member of the sub-group arrives in the area, his or her client device 12 will understand from history of past events that the driver lives nearby and is on schedule to park, since it is Monday at 8 PM, and these details coincide with parking history details. The system will then alert the driver to park on the right side of the main street within 100 feet. In this manner, the "blind-spot" to the neighbor's house will be covered, by the newly-parked sub-group member. In one exemplary implementation, the system may provide a colored indication (such as, for example, a green colored bulls-eye) on touch-screen display 29 of client device 12 who is just arriving in the neighborhood. The bullseye would be centered on the perfect orientation for camera 16 of that particular client device to ensure complete coverage in the area defined by the sub-group.

According to one embodiment, a method for instructing the driver of a vehicle supporting a first video camera (client device) having a first field of view, where to park within an area, comprises first providing a plurality of video cameras (client devices) for continuously recording data within the area. Each of the plurality of video cameras are in communication with each other as part of a network. Each video camera includes a lens having a field of view, a memory for storing data, a processor, and a system for transmitting and receiving data. A next step includes having the first video camera use GPS or Bluetooth technology to determine the relative geolocation of each of the plurality of video cameras in the area. After that, the locations of any hidden regions or blind-spots (areas that are not covered by the field of view of any cameras in the area) are determined by the system. Finally, the system (which could be server 13, or any client device in the network instructs (or suggests) where the driver of the vehicle entering area should park so that the field of view of his or her own client device 12 will help eliminate a blind-spot in surveillance coverage of the area.

Alternatively, according to a variation of the above-described embodiment, a driver entering a neighborhood may be provided with a visual "coverage map" on display 29 of his or her client device 12 showing the areas of coverage of the immediate area around his or her vehicle, as he or she drives, looking for an available parking space. Here, the driver searches for parking spaces in the area based on the number of surrounding client devices covering the particular open space, as shown on the coverage map. For example, if the coverage map shows four cameras covering one open space (i.e., the field of view of each of the four cameras would include the subject parking space) and only one camera covering another parking space, the driver will select the more-covered open parking space, since he or she would want more cameras effectively watching his or her parked vehicle.

According to another embodiment, a first client device 12 is used to detect an event recorded within its field of view 20 and alert other client devices 12 located within a prescribed area around the first client device 12. Object recognition software can be used by the first client device to help detect certain events, such as when a meter-maid or a street-sweeper is approaching on the street. In this example, the first client device 12 will view and record and recognize the object of interest (such as a street-sweeper) approaching and use additional information, such as a history of when the street-sweeper usually operates on the particular street. If it is determined that the street sweeper is scheduled to clean the that street, the first client device can then transmit an urgent notification to other client devices in the area so that the owners of the affected vehicles can move their vehicle before it is too late. Other client devices 12 located near each other can work together to confirm details about an event, such as in the above example of the street-sweeper, multiple client devices 12 can be used to determine the direction and speed of the sweeper as it moves down the street. The notification sent to the owners of the other client devices 12 may include an approximate time when the street-sweeper will arrive at each respective vehicle. This time of arrival estimate may be calculated using GPS. Similar notifications can be transmitted in the event of a break-in or crash.

According to another embodiment, one client device 12 may summon other nearby client devices 12 to an area where an event has taken place, such as the scene of an accident or a traffic stop. By doing this, the summoned client devices will become witnesses to the event (or shortly thereafter), by recording the scene of the event from different angles using camera 16 of their respective client device 12. According to one embodiment, as an incentive for drivers to redirect to a nearby scene to aid a client device member, compensation may be offered in the form of money or points, which may be applied to pay for similar services, perhaps when needed in the future. When drivers accept the request, the video feed of their recording client devices 12 automatically share with the requesting client device, when the two devices become close to each other.

According to another aspect of one embodiment of the invention, at least two client devices 12 located near each other may share live video footage. For example, if at least two client devices 12 are in two different vehicles travelling relatively close to each other along a road, perhaps in traffic, the driver of a first vehicle may use his or her first client device to show all other client devices located nearby (within RF range). The nearby vehicles will appear as "car" graphic icons overlaying a map on touch-screen display 29. The first driver may select one of the icons by touching it on touch-screen display 29. The selected client device 12 would then "link" with the first client device 12 and share live video feed with that device so that the front view of the selected client device 12 appears on display 29 of the first client device. In this manner, the first driver may view other areas around his or her vehicle, such as the view of traffic up ahead, or view his or her own vehicle from behind by selecting a car behind his or her (perhaps to make sure that their boat trailer is OK). A system according to this embodiment would be useful in convoys wherein a group of vehicles agree to travel together along a highway. Rear-positioned vehicles following in the group would not be able to see up ahead owing to vehicular obstructions. To overcome this, they could simple request a live view of the camera of the client device 12 of the forward most vehicle so that the video footage of the forward-most vehicle would play on the display of the client device of one or more other vehicles in the convoy. In addition to real-time video being provided, in one embodiment, the video stored in any of the client devices used in the convoy could be later reviewed. This will improve the chances that other client devices may have captured field of views that may have been obstructed by one particular client video.

According to another embodiment, all members of a network or sub-group can help each other by sharing video from their respect client devices 12, wherever they may be. In this embodiment, the network may be considered "dynamic" because for any one client device 12, the detected client devices located within a prescribed distance therefrom become the network, however temporary. Some client devices 12 will move out of range, while others will enter, keeping the network of client devices surrounding any given client device 12 dynamic. By doing this, useful applications may be realized.

One application according to the above embodiment, is to provide extended automatic surveillance of a vehicle whose owner uses a client device 12 and parks in a parking lot. Conventional car-cams can only record video footage of whatever happens within the camera's field of view. However, the field of view of these conventional car-cams usually covers only a portion of a scene located in front of the parked vehicle. A person could hit a vehicle from the side, and in some cases the rear, without being detected or recorded, since this action would take place outside the field of view of the camera.

Figure 5:
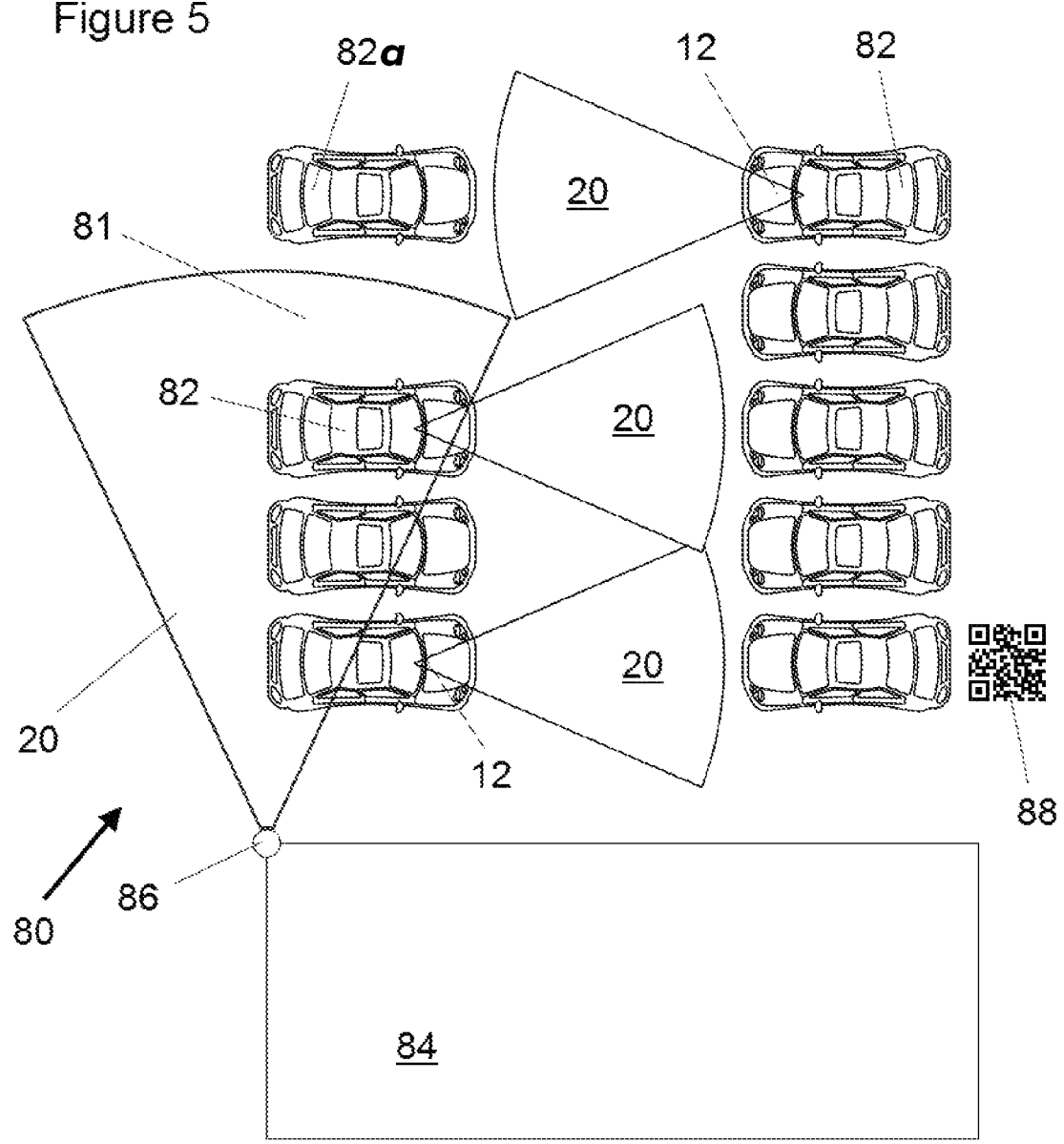
FIG. 5 is a plan view of an exemplary parking lot, showing various parked vehicles, some of which including client devices, according to one embodiment.

Referring now to FIG. 5, an exemplary parking lot 80 with two parallel rows of dash-cam enabled cars 82 is shown according to one embodiment. All nearby client devices 12 are programmed to "connect" with each other, for example using an ad-hoc WiFi network. Client devices 12 continuously record their respective field of views 20 and are prepared to share video data with any other client device 12 member of the network. With many client devices 12 located in the parking lot, invariably the many field of views would cover many different views of the parking lot, including surveillance coverage of all vehicles 82. Each vehicle 82 essentially watches over other vehicles so that many vehicles will be surveilled.

If the owner of a vehicle returns to their vehicle only to see a dent in the fender, the owner may use his or her client device 12 (or supporting application on their portable electronic device) to request a video-share from any client device 12 that is either in the area, or was known to be in the area at a specific time. This includes mobile client devices 12 located in other parked or moving vehicles nearby, and also fixed client devices, such as fixed device 86 shown mounted to a nearby building (or other structure) 84, as shown in FIG. 5. Other client devices 12 may have pre-approved all such sharing requests in advance outright, or with restrictions (as further detailed in parent application PCT/US17/50991). The sharing status of each nearby client device (both mobile and fixed devices) may appear on display 29 the car-owner's client device 12 so that the car-owner may select specific nearby devices which are pre-approved, for example, to speed up the sharing process.

According to this embodiment, when a vehicle 82a having client device 12 enters parking lot 80, all fixed surveillance cameras 86 located throughout the parking lot automatically share data with client device 12. The owner of the entering vehicle 82a will therefore effectively and automatically extend the field of view of his or her own client device 12 by the inclusion of the collective field of views of all fixed cameras 86. Also, any client devices 12 located in other parked vehicles 82 may also share their video data, thereby further extending the effective coverage for each client device located within parking lot 80. Owners of client devices 12 located within parking lot 82 may interact with other client devices located nearby, including sharing video footage, searching for data from any video footage of any client device 12 or fixed camera 84, and tag objects within any of the collective video data. Once a client device 12 leaves the area, it automatically disconnects from the client devices and fixed cameras located in parking lot 80.

According to another embodiment, a group of networked autonomous or self-driving vehicles may each include a client device 12. System 10 uses positional data (GPS location of each client device connected to server 13), to determine the location and field of view 20 of each camera 16 of each device 12 within a given area, such as within a parking lot. According to the invention, system 10 may automatically instruct each autonomous vehicle to position themselves (i.e., park) so that each field of view 20 from each client device 12 may be strategically aligned for maximum surveillance coverage of a particular object (such as a bank), or objects, such as the many vehicles in the group. This allows one camera 16 to surveil the vehicle of another, while other cameras of other vehicles watch others, etc.

Referring again to FIG. 5, and according to another embodiment, parking lot 80 having many parking spaces 81 may already be provided with fixed cameras or client devices 86, mounted to various walls and poles and other permanent structures, such as exemplary building 84. Such fixed cameras 86 are or function similar to fixed client devices 15. When the owner of a vehicle, who is also a networked client device 12 user drives his or her vehicle 82a into lot 80, he or she automatically becomes connected to all the fixed cameras 86 located in the lot, as well as any other client devices 12, located in the parking lot at the time, as described above. With this arrangement, a client device owner may shop in nearby stores, for example and use a supporting application on their portable electronic device (such as a smartphone) to get a live view through any of the fixed cameras provided by the parking lot management, so the vehicle owner may check up on his or her vehicle at any time. Mobile client devices 12 located in other vehicles 82 in the parking lot 80 may also be accessed, with permission from the respective owners. The video data from fixed cameras 86 is stored in servers and made available to any client device owner who later requests a "share video", within a prescribed period of time.

According to yet another embodiment, a unique code 88, such as a QR code (or other similar code, e.g., a Bluetooth beacon, RFID, or the like) may be provided at each parking space 81 located in parking lot 80. Codes 88 could be provided next to each applicable parking space, for example, for manually scanning by a driver outside their car, or on a nearby sign positioned to be automatically scanned by camera 16 of client device 12 as the vehicle pulls into the parking space 81. Alternatively, a simple numeric code, such as those typically painted on the floor could be scanned and recognized by client device 12 as the car pulls into the parking space. Codes 88 allow any driver, regardless if they are a member of the client device network or not, to access security cameras 86, which are provided by the parking lot management, but preferably only those security cameras 86 which oversee their vehicle 82. Such non-members may also be able to know if other networked client devices 12 were nearby at a similar date and time and provide means to request a video-share, for example, in one embodiment, on a reward basis for incentive to cooperate with the request.

According to another embodiment, in the event that two vehicles whose owners use networked client devices 12 hit each other in an accident, a software program operating in each client device 12 will instruct the immediately transfer of all data from their respective video memories 24, at least to each other and, according to another embodiment, also to each driver's respective insurance company. The data being sent is preferably encrypted (with an encryption key being sent by secured means to the owner of the client device) and includes recent video data, metadata, and classifier data (during a prescribed period, before, during and possibly shortly after the accident). The sent data may also include driver profile data, such as name, picture, driver's license information, residence address, and insurance-related information. When either owner of the other vehicle involved in the accident receives information from each other, the recipient cannot open the information until the encryption key is provided. This arrangement allows all important information to be safely retained, yet remains under the control of the sender, since he or she is in control of the encryption key.

Alternatively, according to another embodiment, some or all of the above-described information to be sent, may instead be encrypted and transferred to a secure memory location, either locally, or at server 13, and also sent to the owner's email address, for added security. The owner of the client device will be provided an encryption key for decryption, when needed. This information will be compiled as an encrypted package that can easily be sent, when desired, to a third party, such as an insurance company. As before, the encrypted file will require an encryption key before access is provided.

Many of the above-described embodiments benefit members of the networked system. However, according to yet another embodiment, there are some benefits to individuals and businesses that are not members of the video management network. Some of these are benefits may be enabled through a companion application accessible on a computer or readily-accessible kiosks.

For example, according to one embodiment, a user identifies an area, a location, or a point of interest, such as a house, using a map displayed on the screen of a computer or portable electronic device, and would like to see this area, location, or point of interest in real time. For example, a web-based application called "Street View" provided by Google, Inc. (of Mountain View, Calif.) currently provides views taken at street level of many street-fronts and public locations, but these views are rarely up to date, often being months or possibly years old. According to this embodiment, a user can indicate the location of interest to a running application, which in turn, will transmit a search request, via server 13 to all client devices 12 that are either in the area, or may be in the area within a prescribed time period, as determined by server 13, client device ID information, and GPS location information. Client devices 12 that are at or close to the location indicated by the search request record video footage and then, if they accept the request, transmit the footage to server 13 in near-real time. Server 13, through the application may, for example, notify the requesting user that video clips are available for viewing by clicking on any of the stored video clip icons shown on the user's display. Other means of presenting the requested data may be provided. For example, the application may simply display the available video, for example, as a slide-show of still images from the available video clips, as a looping video clip, or the like. If system 10 determines that no users are currently capturing data, a targeted request can be sent to nearby client devices 12 to divert their destination to capture the requested view. According to one embodiment, the system may provide compensation (offering a "bounty" with cash, rewards, or points), as described in other embodiments.

Figure 6:
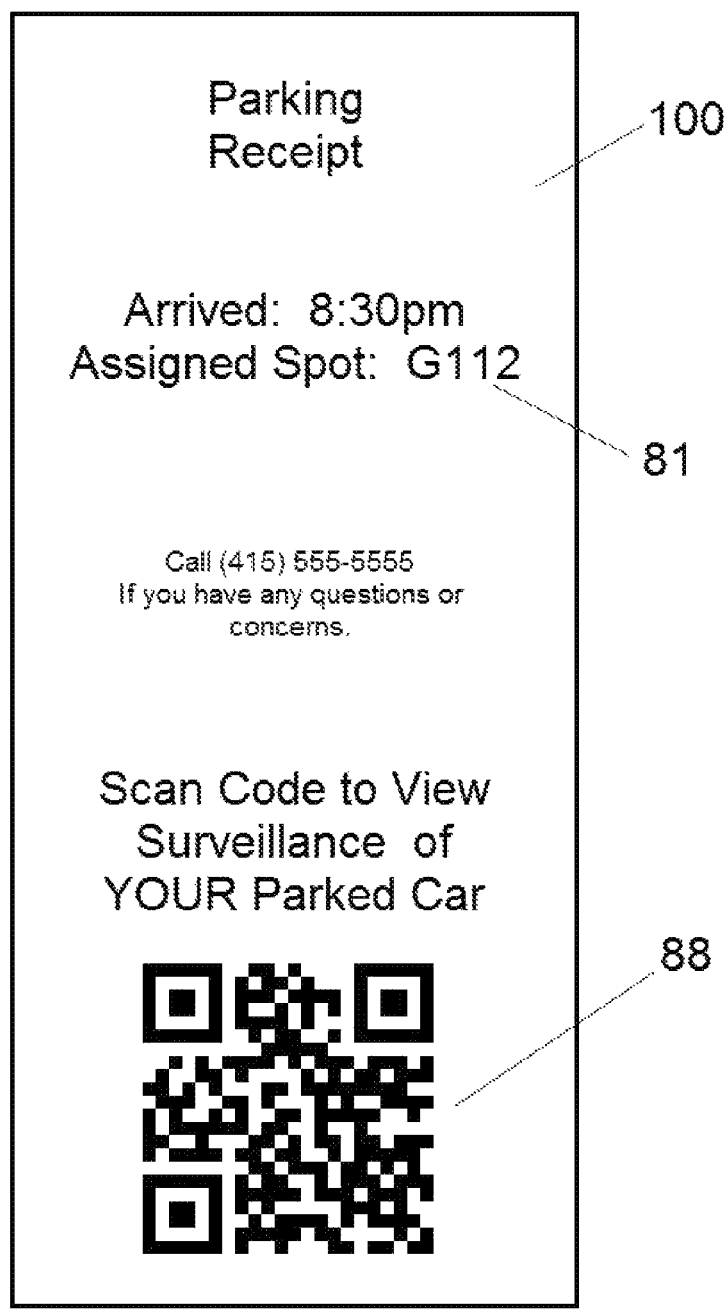
FIG. 6 is a plan view of an exemplary parking receipt according to one embodiment.

Referring back to FIG. 5, and also FIG. 6, and according to yet another embodiment, paid parking lot or garage 80 is provided with fixed security cameras 86 which effectively surveil every parking space 81 (or all "vital" points of view, including entrances and exits, and as many parking spaces 81 as possible). When a driver enters garage or lot 80 and receives a ticket 100, as shown in FIG. 6, ticket 100, according to this embodiment, will indicate his or her assigned parking space 81 (for example, G112 as shown, by way of example, in FIG. 6). QR code 88 may also be provided on the ticket and, if also provided, would match the QR code at the actual parking space (in other words, each parking space includes its own dedicated QR code 88). Other codes may be used as described above. According to this embodiment, drivers who use client devices 12 and those that don't can use this system.

After the user parks his or her vehicle 82 in the assigned space 81, he or she may, at any time thereafter, scan the provided QR code 88, located on ticket 100. QR code 88 will automatically open a program (which must first be downloaded to the user's portable electronic device), which will allow access to live camera footage of the user's assigned parking space 81, as viewed by one or more fixed cameras 86 positioned throughout garage or lot 80.

In such instance, as described above, that QR code 88 is provided at each parking space 81, the owner of the car will have access to at least one security camera, if available, whose field of view includes all or a portion of the driver's vehicle.

In all related embodiments described in this application, the video footage may be stored at a server and may be made available for downloading by verified customers of parking garage (either complementary or for a fee) or lot 80 for a period of time (such as, for example, for 2-3 weeks). The available footage may be preferably restricted to footage that only showed the user's vehicle and only for the time that the user's vehicle was parked in the assigned parking space 81. The owner may use this service should something happen to his or her vehicle while parked in garage 80.

According to another embodiment, the above parking surveillance system may also be used with valet parking services. According to this embodiment, a driver relinquishes his or her vehicle to a valet attendant, who then gives the driver a valet receipt and proceeds to drive the vehicle to a parking lot or garage. The receipt will include a QR code which functions as above, but now the valet attendant will first park the vehicle in any available parking space in and then input into their database the space ID that currently holds the parked vehicle. As before, surveillance cameras positioned throughout the parking facility will capture and record all parking spaces. At any time after the vehicle is parked and the parking space ID is associated with the code provided to the vehicle owner, the owner of the vehicle may use the QR code provided on his or her valet ticket to automatically open the valet's website, or similar application and access live video feed (or other information) for his or her vehicle. If the QR code does not have an associated parking space when the user trys to access the system, for example, if the valet attendant has not yet assigned a parking space 81 to the vehicle, then the user can be given a "processing" message, a view of the entire parking area and/or an option to directly contact valet to ask why access is not yet available.

QR code 88 will cause the application to interrogate the server's database to link QR code 88 with one or more of surveillance cameras 86, the ones that show the user's vehicle 82. The user may then view live video footage showing his or her vehicle in the assigned parking space 81. As before, the footage is available for a length of time thereafter, such as, for example, 2-3 weeks.

In an alternative embodiment of the valet parking system, a "loaner" client device 12 can be temporarily positioned in a vehicle by a valet attendant to provide surveillance while the vehicle remains parked in garage or lot 80. Temporary Client device 12 remains in vehicle 82 and the owner, as in the above embodiments, continues to have with full access to inside/out views as well as fixed cameras in the lot itself.

According to another embodiment, client devices 12 of a network may be used to track any characteristic of a vehicle or an object moving through the network and using AI to predict future path of the tracked vehicle. For example, during an "Amber Alert," information about a suspect's vehicle is broadcasted on everyone's smartphones, and drivers are alerted to watch out for any vehicle that matches the description and then alert authorities of any sightings. The present invention may use object-recognition software to scan all objects and other details appearing in field of view 20 of cameras 16 of all client devices 12 located within a network. For example, if the vehicle description for the Amber Alert is a Red Late-Model pickup truck, the object-recognition software can be used to scan current recorded video from each client device located in an area of interest (an area that it is believed the suspect is likely residing at a given time), and also already recorded video from each video memory 24 of each client device 12 in the prescribed area. The software will notify server 13 every time a red pickup truck enters the field of view 20 of any client device 12 in the network. Server 13 can then automatically report potential sightings to Amber Alert authorities, as needed. Also, notifications from the Amber Alert system may be able to automatically connect to server 13 so that the description information may automatically generate an appropriate search request to server 13, which will then determine which client devices 12 of the network should be notified, based on their respective current, past, and future location. Any sighting by any client device 12 may establish the heading and speed of the suspect being tracked. This information may be used to notify other specific client devices 12 to watch for the suspect's vehicle, based on the predicted path of the suspect.

According to another embodiment of the invention, client device 12 uses global positioning system (GPS) data and information from server 13 to automatically help redirect drivers either towards or away from an object of interest, depending on what the driver wants to do. For example, if an accident is reported ahead of a vehicle driven by a client device user, and this is confirmed by either the client device 12 of the actual vehicle that was involved in the accident, or other client devices 12 that detected the accident as their vehicle passed by. Regardless, system 10 will determine which vehicles, with client devices 12 are approaching the accident, as traffic slows down. To help network clients, system 10 automatically instructs select member vehicles (that are or will be affected) to redirect their route to avoid the accident and traffic. New directions will be sent to and displayed (and/or audibly announced) on each affected client device 12, e.g., "Turn Left in 500 feet to avoid upcoming accident." Alternatively, the system may help direct a vehicle to a point of interest, following a search request or a witness request as described in several embodiments of this disclosure.

According to yet another embodiment, client devices 12 may be used to automatically detect emerging inclement weather, such as snowfall, road hazards, and potholes and notify specific client devices 12 whose respective vehicles are approaching the area of concern. This information is automatically compiled by server 13 and shared with GPS location information to various relevant agencies, as needed, so the potholes can be repaired, for example. Additionally, each client device may use image recognition software and collected sensor data to look for small changes in road conditions. Over time the data will be confirmed by many client devices 12 revealing verified and accurate data which may be useful to other drivers or even other third parties (e.g., certain government agencies or other business concerns). The system of the present invention can use this information in combination with other collected information, such as detected movement of vehicles (either the vehicle that uses a client device 12, or vehicles being recorded by a client device) wherein the detected movement suggests a road hazard, such as an accident, vehicle swerving, or sliding, or even a traffic stop. This collected event information when correlated with collected road condition information forms a dataset that is likely useful to insurance companies, law enforcement agencies, road maintenance agencies, and agencies collecting highway statistics, to state a few examples.

According to yet another embodiment, client devices 12 of the network can be used as a general communication device, as introduced above, wherein a driver may request to be connected with another driver based on certain requirements. Client device 12 can detect if a driver is nodding off by tracking eye movement of the driver. If so, client device 12 may sound an alarm and may then suggest that the driver pull over for rest. If the driver continues to drive, client device 12 will recommend that the driver connect with another driver in the network so that the two drivers may keep each other awake and entertained as they drive.

According to another embodiment, a driver in need of information about an upcoming point of interest, or city, can request to speak with another person in the network who is knowledgeable in the desired area of interest, such as "I'm visiting San Francisco soon. Does anyone know the best places to eat?" The request can be sent to an approved list of client device users, or to anyone. The requesting driver is given a list of people who can help and he or she may select one of them to initiate a video-chat. The two can communicate with each other as they both drive. Both people will be given a live view of camera 16 of the other person's client device 12 (either an inside view or a forward view).

The foregoing description of the embodiments has been presented for illustration only; it is not intended to be exhaustive or to limit the patent rights to the precise forms disclosed. Persons skilled in the relevant art can appreciate that many modifications and variations are possible in light of the above disclosure. The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following.

The invention claimed is:

1. A method of sharing video data between a plurality of remote cameras and a local camera in wireless-communication with each other, the method comprising:
   initiating, at said local camera, a preliminary search of the plurality of remote cameras, the preliminary search automatically searching a memory in each of the plurality of remote cameras for data that matches a search criteria;
   receiving, in response to said preliminary search, an indication that the data in the memory of at least one of the plurality of remote cameras matches the search criteria;
   requesting, at said local camera, permission to perform a secondary search of the memory of the at least one of the plurality of remote cameras;
   requesting the secondary search of the memory of the at least one of the plurality of remote cameras, the secondary search configured to identify video data matching a video search query; and
   receiving video data matching the video search query from said at least one of said plurality of remote cameras.

2. The method of claim 1, wherein said requesting permission step is performed in response to receiving the indication that the data in the memory of at least one of the plurality of remote cameras matches the search criteria.

3. The method of claim 1, wherein said secondary search checks more data in the memory than the preliminary search.

4. The method of claim 1, wherein said search criteria includes metadata and location information of said local camera.

5. The method of claim 1, wherein said search criteria includes classifier data.

6. The method of claim 1, wherein the indication comprises identification information of said at least one of the plurality of remote cameras.

7. The method of claim 1, wherein the receiving, in response to said preliminary search, an indication further comprises receiving an indication from a plurality of the remote cameras that a data in each of the remote cameras of the plurality of remote cameras matches the search criteria and further wherein said requesting step further comprises requesting permission to perform the secondary search of the memory of the remote cameras of the plurality of remote cameras.

8. A method of sharing video data between a plurality of remote cameras and a local camera, each camera being in wireless-communication with each other, said method comprising:
   initiating, at said local camera, a preliminary search of the plurality of remote cameras, the preliminary search automatically searching a memory in each of the plurality of remote cameras for data that matches a search criteria;
   receiving, in response to said preliminary search, an indication that the data in the memory of a subset of the plurality of remote cameras matches the search criteria;
   requesting, at said local camera, permission to perform a secondary search of the memory of the subset of the plurality of remote cameras;
   requesting the secondary search of the memory of the subset of the plurality of remote cameras, the secondary search configured to identify video data matching a video search query; and
   receiving video data matching the video search query from at least one of the subset of the plurality of remote cameras.

9. The method of claim 8, wherein said requesting permission step is automatic in response to receipt of the indication of a match from said subset of the plurality of remote cameras.

10. The method of claim 8, wherein said secondary search is more detailed and comprehensive than said preliminary search.

11. The method of claim 8, wherein said search criteria includes metadata and location information of said local camera.

12. The method of claim 8, wherein said search criteria includes object classifier data.

13. The method of claim 8, wherein said receiving step includes receiving identification information of said subset of the plurality of remote cameras.

14. The method of claim 8, wherein said requesting step only requests permission to search said subset of the plurality of remote cameras.

15. A method of sharing video data between a plurality of remote cameras and a local camera in wireless-communication with each other, the method comprising:
   initiating, at said local camera, a preliminary search of the plurality of remote cameras, the preliminary search automatically searching a memory in each of the plurality of remote cameras for data that matches a search criteria;
   receiving, in response to said preliminary search, an indication that the data in the memory of at least one of the plurality of remote cameras matches the search criteria;
   requesting, at said local camera, permission to perform a secondary search of the memory of the at least one of the plurality of remote cameras;
   requesting the secondary search of the memory of the at least one of the plurality of remote cameras, the secondary search configured to identify video data matching a video search query based on a first algorithm;

receiving video data matching the video search query from said at least one of said plurality of remote cameras;

displaying said received video data on a display associated with the local camera;

receiving user confirmation that the received video data matches the video search query; and adjusting the first search algorithm based on the user confirmation to improve an accuracy of a subsequent search.

16. The method of claim 15, further comprising requesting the subsequent search of the memory of the remote camera for data that matches the search criteria, based on said adjusted first search algorithm.

17. The method of claim 15, wherein the user confirmation is based at least in part on input from a touch-screen display indicative of video data that matches the video search query.

18. A method of sharing video data between a plurality of remote cameras and a local camera in wireless-communication with each other, the method comprising:

initiating, at said local camera, a preliminary search of the plurality of remote cameras, the preliminary search automatically searching a memory in each of the plurality of remote cameras for data that matches a search criteria, said search criteria including metadata and a video clip corresponding to an event;

receiving, in response to said preliminary search, an indication that the data in the memory of at least one of the plurality of remote cameras matches the search criteria;

requesting, at said local camera, a permission to perform a secondary search of the memory of the at least one of the plurality of remote cameras, the requesting a permission comprising notifying an authorizing user of the at least one of the plurality of remote cameras by playing the video clip corresponding to the event on a display for viewing by the authorizing user;

requesting the secondary search of the memory of the at least one of the plurality of remote cameras in response to receiving the permission from the authorizing user, the secondary search configured to identify video data matching a video search query;

receiving video data matching the video search query from said at least one of said plurality of remote cameras.

19. The method of claim 18, wherein said playing is automatic.

20. The method of claim 18, wherein the initiating comprises sending a text message from the local camera to the plurality of remote cameras.

* * * * *